INVENTOR.
BURTON F. LATHAM JR.

United States Patent Office 3,186,146
Patented June 1, 1965

3,186,146
APPARATUS FOR WASHING GASES
Burton F. Latham, Jr., Houston, Tex., assignor to Continental Carbon Company, Houston, Tex., a corporation of Delaware
Filed May 21, 1962, Ser. No. 196,288
1 Claim. (Cl. 55—238)

This invention relates to apparatus for treating gases, and more particularly to the treatment of aerosols in such manner as to facilitate the recovery of solids which are suspended therein.

Generally stated, the present invention comprises a novel combination of helical flow Venturi-scrubber with a cyclone, or centrifugal, separator, the said combination of instrumentalities being so arranged that the helical flow which is obtained by the Venturi-scrubber is used both to obtain contact between the aerosol particles and the scrubbing fluid and also to remove the liquid trapped aerosol particles from the effluent gas stream.

The Venturi-scrubber is, of course, well-known and its principle is to effect coalescence of the suspended particulate substances with droplets of a scrubbing liquid in order to result in particulate combinations which are then capable of being readily separated by methods of employing the principles of gravitation.

It is among the objects of the present invention to provide an improved apparatus for treating gases which obtains a greatly enhanced scrubbing action.

Another object is the provision of an apparatus of the class described which is relatively inexpensive to install, operate and maintain.

The foregoing and other objects will be more readily understood after referring to the following specification and annexed drawings in which like reference numerals designate like parts, and in which.

Figure 1:
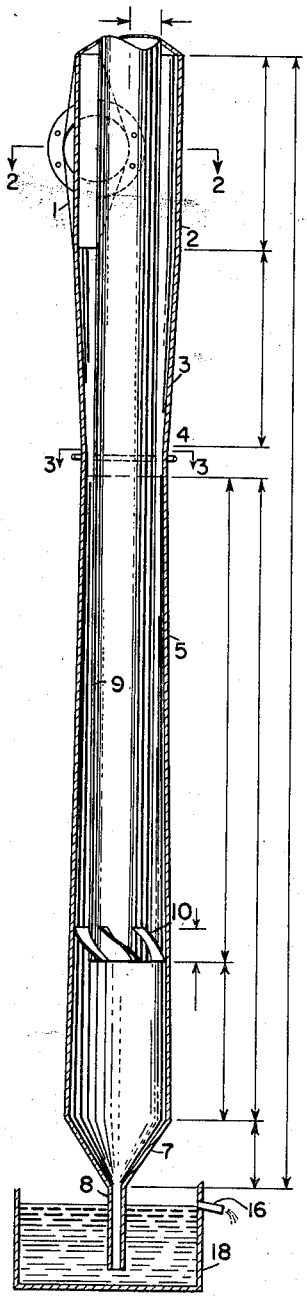
FIGURE 1 is a vertical elevational view, partly in section, of an apparatus which embodies the teachings of the present invention; and which illustrates the inner and outer pipes or tubes that will be referred to hereinafter.
Figure 2:
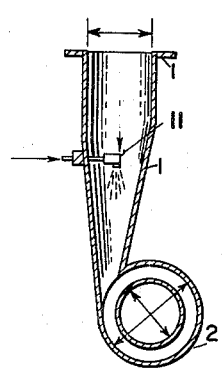
FIGURE 2 is a sectional view taken on the line 2—2 of FIGURE 1 and illustrates the tangential gas inlet pipe which communicates with the space between the aforementioned inner and outer pipes or tubes.

Referring more particularly to FIGURE 1, the numeral 1 generally designates the gas inlet pipe which tangentially communicates with the upper cylindrical section 2 of the Venturi-scrubber.

That portion of the gas inlet pipe which is most adjacent the upper cylindrical section of the vertically disposed tubular outer conduit 2 is flattened in the manner well-known in the art.

Proceeding, then, to describe the remainder of the outer tube of the apparatus, it will be noted that the lower end of the upper cylidnrical section 2 of the tubular outer conduit connects with the upper end of an inwardly tapering, or inverted frusto-conical, section 3. The lower end of the inverted frusto-conical section 3 connects with the Venturi section of the outer tube which is designated at 4 and shown as comprising a relatively short cylindrical section which connects with the upper end of an elongate downwardly flared, or frusto-conical, section 5; the latter constituting the recovery section, as will be explained hereinafter.

The lower, and diametrically largest, end of the elongate frusto-conical recovery section 5 of the outer tube connects with an inwardly tapering, or funnel-shaped section 7 having a centrally disposed discharge tube 8.

The lower end of the substantially cylindrical (inner) sleeve 9 terminates a substantial distance above the elongate frusto-conical recovery section 5 of the tubular outer conduit; and it is provided on its lower end with a series of curvilinear and helically disposed whirling vanes 10 which extend at approximately 45° angles with respect to the axis of the said sleeve.

The space between the upper end of the upper cylindrical section of the tubular outer conduit 2 and the adjacent portion of the substantially cylindrical inner sleeve 9 being closed in the manner well-known in the art; for example, as in FIGURE 4 of Patent No. 1,734,677 to Kreisinger, dated November 5, 1929.

As previously mentioned, the tangential inlet tube 1 tapers from a cylindrical cross-section into a flattened section adjacent its point of connection with the upper cylindrical section 2 of the tubular outer conduit. A spray-head 11 is axially disposed within said flattened section, the said spray-head being directed toward the tangential gas inlet of the apparatus and serves to supply sufficient water to saturate the entering gas.

Figure 3:
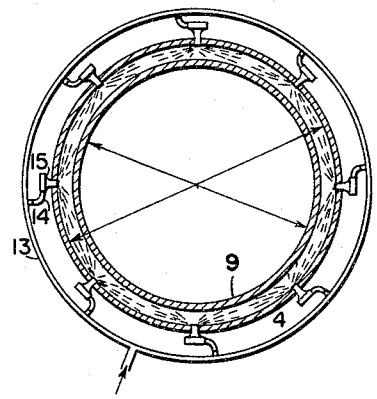
FIGURE 3 is an enlarged sectional view taken on the line 3—3 of FIGURE 1 and illustrates the neck of the Venturi and the ring-type manifold whose function will be later described.

Encircling the short cylindrical Venturi section 4 is a ring-pipe manifold 13, the same comprising a series of elbows 14, each of which connects the said ring-pipe with a spray-head 15 for supplying water to the annular space between the tubular outer conduit and the inner sleeve 9; eight of such elbows and sprays being shown in FIGURE 3.

Referring to the bottom of FIGURE 1, the lower end of the discharge tube 8 of the funnel-shaped section 7 of the tubular outer conduit extends downwardly into a seal pot 18 containing a slurry, the purpose of which is to receive the water trapped aerosol particles as they leave the scrubber. A constant slurry level is maintained by providing seal pot 18 with a discharge conduit 16.

According to the foregoing construction and arrangement of the elements of the apparatus of the invention, an aerosol to be treated flows through and from the inlet pipe 1 and enters the flattened tangential inlet from which it is directed into a relatively high and narrow stream of gas, the ratio of the latter being, for example 12:1. As previously stated sufficient water is introduced into tangential inlet 1 by the spray-head 11 to saturate the entering gas. The stream from the tangential inlet 1 enters the upper cylindrical section 2 located immediately in front of the Venturi and then passes into the inwardly tapering Venturi inlet section 3. The downward passage of the moisture saturated gas through this section is in a helical path, progressively increasing in velocity. The gas next enters the relatively short cylindrical section, or annular neck 4, passing downwardly therethrough in a helical path at approximately four times the velocity of movement of said gas through the aforementioned Venturi inlet section 3. Each of the spray-heads 15 in the relatively short cylindrical Venturi section 4 introduces water in the form of a hollow cone with a wide angle (approximately 150°) spray pattern that practically covers the entire area of said section. The high velocity helical motion of the aerosol particles in the relatively short cylindrical section 4 tends to cause collisions between these particles and the scrubbing water droplets introduced by the spray-heads 15. The helical flow of the aerosol particles tends to throw both aerosol particles and water droplets against the outside wall of the Venturi by centrifugal force. This helical whirling motion and separation continues down the outlet Venturi recovery section 5 where part of the velocity head created in the relatively short cylindrical section 4 is recovered as static head in said section. At the lower end of the recovery section 5 the eight whirling vanes 10 help keep the gas flow in a helical motion and also act to support the substantially cylindrical (inner) sleeve 9, keeping it centered with respect to the tubular outer conduit. There is also impingement of the aerosol particles and water droplets on these whirling vanes 10, thus further aiding in trapping the aerosol particles. The helical gas flow reverses its downward flow in the lower end of the aforementioned elongate frusto-conical recovery section 5 after leaving the whirling vanes 10; and moves upwardly through the substantially cylindrical sleeve 9 which is the discharge pipe of the apparatus. This tends to separate the remaining aerosol particles, trapped in water droplets, from the effluent gas stream; these droplets dropping out through the lower funnel-shaped section 7 and its discharge tube 8, the latter being sealed off by means of a slurry which is maintained at proper level in a seal pot 18. The clean effluent gas leaves the scrubber through the substantially cylindrical sleeve 9, as previously mentioned.

The actual angular throat velocity due to helical flow may be four to five times the axial velocity; and, in actual practice, I have obtained angular velocity in the order of from 400 to 500 f.p.s. It is this high angular velocity that produces the excellent scrubbing action of the apparatus of the present invention.

It will be noted that as illustrated the outlet Venturi recovery section 5 comprises over ½ the total length of the outer tube of the scrubber. This section may, of course, be considerably shortened with added losses of pressure drop accompanied by a small loss in scrubbing action.

While I have shown and described certain specific embodiments of the present invention, it will be readily understood that I do not wish to be limited exactly thereto, since various modifications may be made without departing from the scope of the invention as defined in the appended claim.

What I claim is:

In an apparatus for washing gases, a vertically disposed tubular outer conduit; said vertically disposed tubular outer conduit including, in a downward direction, an upper cylindrical section, an inverted frusto-conical section of substantially the same length as said upper cylindrical section; a relatively short cylindrical Venturi section, an elongate frusto-conical section of materially greater length than said upper cylindrical section and said inverted frusto-conical section and a funnel-shaped bottom section; a substantially cylindrical sleeve; means for mounting said sleeve concentrically in, and spaced from said vertically disposed tubular outer conduit with its lower end substantially above the lower end of the elongate frusto-conical section of said tubular outer conduit; means for closing the space between the upper end of said cylindrical sleeve and the adjacent portion of said tubular outer conduit; a series of inwardly directed sprays positioned in said Venturi section for delivering washing liquid thereinto; a tangentially disposed gas inlet connected to the upper cylindrical section of said tubular outer conduit; said tangentially disposed gas inlet tapering from a cylindrical cross-section into a flattened section; said mounting means including a series of vanes carried on the exterior of the lower end of said substantially cylindrical sleeve for imparting a whirling action; means in said tangentially disposed gas inlet for saturating the gas entering the upper cylindrical section of said tubular outer conduit; and a liquid seal disposed beneath and enveloping the lower end of the funnel-shaped section of said tubular outer conduit.

References Cited by the Examiner

UNITED STATES PATENTS

| | | | |
|---|---|---|---|
| 1,734,677 | 11/29 | Kreisinger. | |
| 2,200,891 | 5/40 | Nyborg | 55—236 |
| 2,250,757 | 7/41 | Fisher | 55—238 |
| 2,604,185 | 7/52 | Johnstone et al. | 55—238 |

FOREIGN PATENTS

| | | |
|---|---|---|
| 624,542 | 4/27 | France. |
| 903,942 | 2/45 | France. |
| 1,067,737 | 1/54 | France. |
| 1,081,424 | 5/60 | Germany. |

HARRY B. THORNTON, *Primary Examiner.*

HERBERT L. MARTIN, GEORGE D. MITCHELL,
*Examiners.*